United States Patent
He

(10) Patent No.: US 7,998,452 B2
(45) Date of Patent: Aug. 16, 2011

(54) SPHERICAL TRICOBALT TETRAOXIDE AND METHOD OF PREPARING THE SAME

(75) Inventor: Jinhua He, Yuyao (CN)

(73) Assignee: Ningbo Jinhe New Materials Co., Ltd., Yuyao (CN)

( * ) Notice: Subject to any disclaimer, the term of this patent is extended or adjusted under 35 U.S.C. 154(b) by 0 days.

(21) Appl. No.: 12/614,611

(22) Filed: Nov. 9, 2009

(65) Prior Publication Data

US 2010/0135897 A1   Jun. 3, 2010

(30) Foreign Application Priority Data

Nov. 28, 2008   (CN) .......................... 2008 1 0162689

(51) Int. Cl.
*C01G 51/00* (2006.01)
(52) U.S. Cl. ................... 423/594.19; 423/140; 423/142; 423/144; 423/147
(58) Field of Classification Search ............. 423/594.19, 423/140–147
See application file for complete search history.

(56) References Cited

U.S. PATENT DOCUMENTS

| 1,365,358 | A | * | 1/1921 | Udy et al. ...................... 423/142 |
| 2,488,561 | A | * | 11/1949 | Schaal .......................... 423/140 |
| 2,570,882 | A | * | 10/1951 | Stiles ............................. 264/654 |
| 2,726,144 | A | * | 12/1955 | Pincott et al. ................. 423/140 |
| 2,909,408 | A | * | 10/1959 | West et al. ............... 423/594.19 |
| 2006/0263690 | A1 | * | 11/2006 | Suhara et al. .............. 429/231.3 |

FOREIGN PATENT DOCUMENTS

WO    2004/051771   *  6/2004

* cited by examiner

*Primary Examiner* — Steven Bos
(74) *Attorney, Agent, or Firm* — Matthias Scholl P.C.; Matthias Scholl

(57) ABSTRACT

A method of preparation of spherical tricobalt tetraoxide, including at least oxidizing a bivalent cobalt salt in a wet environment and in the presence of a precipitant, a complexing agent, and an oxidant to yield spherical cobalt oxyhydroxide.cobalt hydroxide according to the following equation $Co^{2+}+3OH^-+O \rightarrow CoOOH.Co(OH)_2$; oxidizing the spherical hydroxy cobalt oxyhydroxide.cobalt hydroxide to yield spherical tricobalt tetraoxide according to the following equation $6CoOOH.Co(OH)_2+O \rightarrow 4Co_3O_4+9H_2O$; and roasting the spherical tricobalt tetraoxide at low or intermediate temperature to yield a black powder. The method is easily practiced and suitable for mass production, and the resultant spherical tricobalt tetraoxide has stable structure, reliable properties, and high activity.

6 Claims, 1 Drawing Sheet

SPHERICAL TRICOBALT TETRAOXIDE AND METHOD OF PREPARING THE SAME

CROSS-REFERENCE TO RELATED APPLICATIONS

Pursuant to 35 U.S.C. §119 and the Paris Convention Treaty, this application claims priority benefits to Chinese Patent Application No. 200810162689.2 filed on Nov. 28, 2008, the contents of which are incorporated herein by reference in their entirety.

BACKGROUND OF THE INVENTION

1. Field of the Invention

The invention relates to a compound and a method of preparing the same, and more particularly to tricobalt tetraoxide as a precursor of cathode materials for lithium-ion batteries and a preparation method thereof.

2. Description of the Related Art

In 1991, Sony Corp. (Japan) successfully developed a cathode material of lithium cobalt oxide for lithium-ion batteries. Since then, lithium-ion batteries have rapidly developed in industry and have been widely used in mobile phones, cameras, notebook computers, and portable electrical appliances.

Due to obvious advantages in resources, labors, and policies, lithium-ion battery industries have developed rapidly in China and have attained a strong international competitiveness. Battery-grade tricobalt tetraoxide ($Co_3O_4$) is one of the key materials for the preparation of the cathode material of lithium cobalt oxide. With the increasing demand on lithium ion rechargeable batteries, the demand on $Co_3O_4$ has also been increased. Compared with conventional $Co_3O_4$ for industrial use, battery-grade $Co_3O_4$ demands higher purity, and has stricter requirement on physical properties (such as density, particle size, specific surface area, particle size distribution, and crystal morphology), electrochemical performance, and stability.

Chinese Pat. No. 03148092.6 disclosed a method of preparation of high purity and spherical tricobalt tetraoxide, and Chinese Pat. No. 200510015002.9 disclosed a method of preparation of an anode material of tricobalt tetraoxide for lithium ion batteries.

Conventional methods of preparation of tricobalt tetraoxide include gas phase methods, liquid phase methods, and solid phase methods. Powder $Co_3O_4$ is generally prepared by a combustion method or pyrolysis method. However, powder $Co_3O_4$ obtained by a combustion method has a low purity, large particle size, wide particle size distribution, and poor sintering activity, and its physical and chemical properties hardly meet the requirements of the electronic industry. A pyrolysis method is to decompose a divalent cobalt compound, such as $CoAc_2$, $CoC_2O_4$, $Co(OH)_2$, or $CoCO_3$ under a certain temperature to yield $Co_3O_4$. However, the method consumes a large amount of energy and the resultant $Co_3O_4$ has a poor activity.

A method of preparation of monodisperse nano-sized powdery $Co_3O_4$ by a hydrothermal method is known, but the method is not suitable for industrial production.

A method of preparation of spherical powdery $Co_3O_4$ having good dispersive property by controlling the kind and using amount of precipitant and surfactant is also know. The precipitant used was $NH_4HCO_3$, and high molecular weight of surfactant was involved, which caused difficulty in filtering the precipitate.

A method of preparation of $Co_3O_4$ by directly oxidating a mixture consisting of $Co(NO_3)_2$, $H_2O_2$, and NaOH in aqueous solution is also known. But the resultant precipitate contained cobalt hydroxide and hydrates thereof, and when dried and calcined, an aggregate consisting of particles (0.5 μm) was obtained. Avoiding aggregate formation in preparation of powdery $Co_3O_4$ became a problem.

A method of preparation of $Co_3O_4$ using $Na_2CO_3$ as a precipitant is also known. However, the resultant precipitate was hardly separated, and impurity such as $Na^+$ adsorbed on colloidal particles was hardly removed by washing. If $NH_4HCO_3$ is used as a precipitant, the resultant precipitate is basic cobalt carbonate. Although the precipitate was separated and impurities removed, $Co_3O_4$ was obtained only under high temperature, and its appearance was unsatisfactory. Furthermore, when $NH_4HCO_3$ was used as a precipitant for preparation of $Co_3O_4$, a large amount of energy was consumed, the precipitation was not complete, a large amount of metal was lost, and much wastewater containing ammonia was produced.

SUMMARY OF THE INVENTION

Therefore, in view of the above-described problems, it is one objective of the invention to provide a method of preparation of spherical tricobalt tetraoxide that has stable structure, good properties, and high activity.

It is another objective of the invention to provide spherical tricobalt tetraoxide that has stable structure, good properties, and high activity.

To achieve the above objectives, in accordance with one embodiment of the invention, provided is a method of preparation of spherical tricobalt tetraoxide that has stable structure, good properties, and high activity. The method comprises: oxidizing a bivalent cobalt salt in a wet environment and in the presence of a precipitant, a complexing agent, and an oxidant to yield spherical cobalt oxyhydroxide.cobalt hydroxide according to the following equation $Co^{2+}+3OH^-+O \rightarrow CoOOH.Co(OH)_2$; oxidizing the spherical hydroxy cobalt oxyhydroxide.cobalt hydroxide to yield spherical tricobalt tetraoxide according to the following equation $6CoOOH.Co(OH)_2+O \rightarrow 4Co_3O_4+9H_2O$; and roasting the spherical tricobalt tetraoxide at low or intermediate temperature to yield a black powder.

In a class of this embodiment, the method comprises steps of:
   a) preparing a cobalt salt solution with concentration of between 0.5 and 3 mol/L;
   b) preparing a hydrate with concentration of between 1 and 10 mol/L as a precipitant solution;
   c) preparing a complexing agent solution with concentration of between 0.5 and 200 g/L;
   d) simultaneously adding the cobalt salt solution, the precipitant solution, and the complexing agent solution by a cocurrent method into a reactor, allowing to react with stirring, and constantly adding an oxidant during reaction; the pH value of reaction being maintained at between 8 and 13, and the reaction temperature being maintained at between 40 and 90° C.;
   e) stirring for between 2 and 48 hrs at a constant temperature;
   f) centrifugating, washing, drying, and grinding the product from e) to yield a precursor of spherical tricobalt tetraoxide; and
   g) roasting the precursor for between 2 and 20 hrs at between 200 and 500° C. to yield a powdery spherical tricobalt tetraoxide.

In a class of this embodiment, the oxidant is oxygen, air, or hydrogen peroxide, and the amount thereof used is between 1.2 and 3.0 times of the stoichiometric amount needed to oxidize the compounds.

In a class of this embodiment, the cobalt salt is cobalt sulfate, cobalt chloride, cobalt oxalate, or cobalt nitrate.

In a class of this embodiment, the hydrate is sodium hydroxide, potassium hydroxide, or a mixture thereof.

In a class of this embodiment, the complexing agent is sodium tartrate, disodium EDTA, ethylenediamine, hexamethylenetetramine, polyacrylamide, citric acid, or a mixture having two of them.

In accordance with another embodiment of the invention, provided is a spherical tricobalt tetraoxide prepared from a cobalt salt solution by complexing, precipitating, oxidating, washing, drying, and roasting, the cobalt content thereof is between 72.0 and 74.0%, diameter thereof $D_{50}$ is between 2 and 15 μm, and tap density thereof is between 1.6 and 3.5 g/cm$^3$.

Advantages of the invention are summarized below:
1) Raw materials such as cobalt salts, hydrates, oxidants, and complexing agents are easily available, and the prepared spherical powders have high activity and homogenous density and particle size distribution;
2) The precursor of spherical tricobalt tetraoxide is directly prepared from liquid phase and then roasted at low or intermediate temperature to give a powdery spherical tricobalt tetraoxide solving the problems of low purity, large particle size, wide particle size distribution, poor sintering activity, large energy consumption, particle aggregating, and difficulty with washing;
3) Compared with conventional tricobalt tetraoxide, spherical tricobalt tetraoxide of the invention has stable structure, reliable properties, high activity, and its particle size, density, components, and processing are easily controlled; and
4) The method of preparing powdery spherical tricobalt tetraoxide is easy for practice and is suitable for mass production.

BRIEF DESCRIPTION OF THE DRAWINGS

The invention is described hereinbelow with reference to accompanying drawings, in which.

DETAILED DESCRIPTION OF THE EMBODIMENTS

Figure 1:
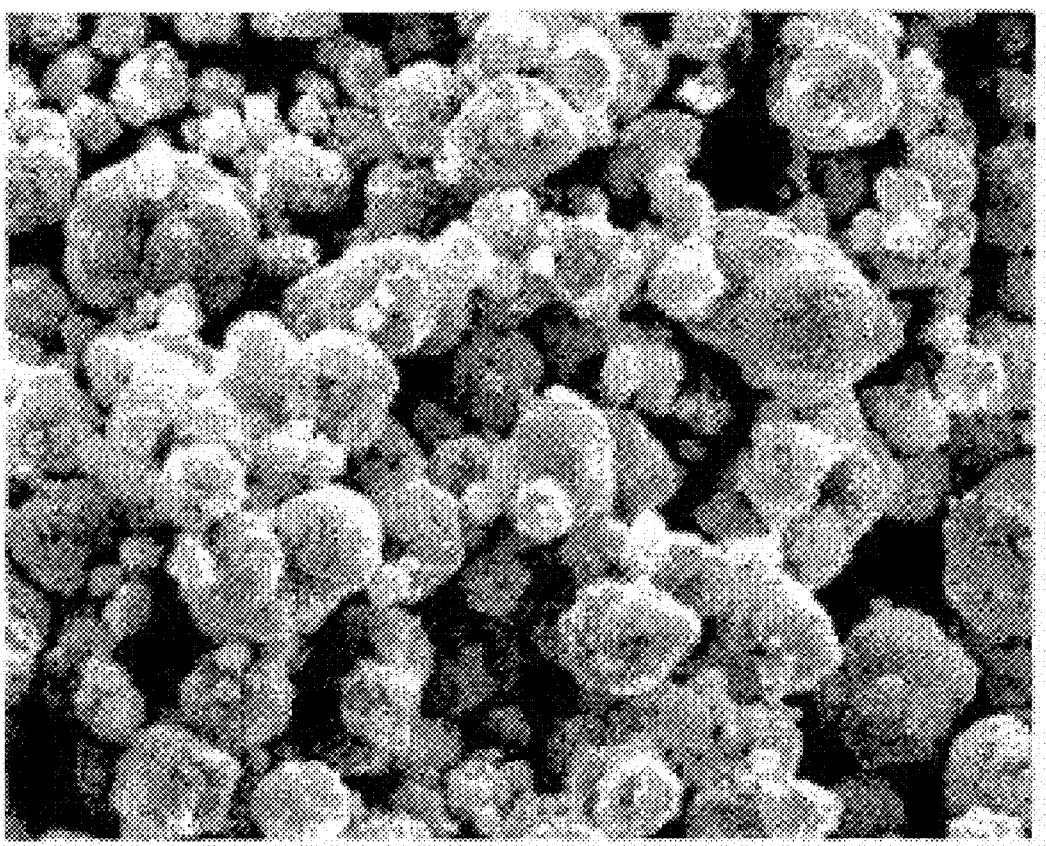
FIG. 1 is an enlarged microscopic view of spherical tricobalt tetraoxide according to one embodiment of the invention.

For further illustrating the invention, examples detailing a method of preparing spherical tricobalt tetraoxide are described below. It should be noted that the following examples are intended to describe only and not to limit the invention.

Example 1

A cobalt sulfate solution (2 mol/L) and sodium hydroxide solution (5 mol/L) were prepared respectively. To the cobalt sulfate solution, citric acid was added. The resultant mixture and the sodium hydroxide solution were simultaneously added into a reactor by a cocurrent method, and the reaction mixture was allowed to react at 50° C. The pH value was measured at 11. Oxygen was charged uniformly as an oxidant, and the amount thereof was 1.2 times that needed for completely oxidizing the generated cobalt hydroxide. After reaction completion, the solution was aged for 10 hrs at a constant temperature, dried at 110° C., and roasted at 350° C. for 10 hrs to yield spherical tricobalt tetraoxide with diameter $D_{50}$ of 8.1 μm and tap density of 2.3 g/cm$^3$.

Example 2

A cobalt chloride solution (2 mol/L) and sodium hydroxide solution (5 mol/L) were prepared respectively. To the cobalt chloride solution, hexamethylenetetramine was added. The resultant mixture and the sodium hydroxide solution were simultaneously added into a reactor by a cocurrent method, and allowed to react at 60° C. with pH value being at 10.5. Air as an oxidant was charged uniformly, and the amount thereof was 2.5 times that needed for completely oxidizing the generated cobalt hydroxide. After reaction completion, the solution was aged for 12 hrs at a constant temperature, dried at 110° C., and roasted at 400° C. for 8 hrs to yield spherical tricobalt tetraoxide with diameter $D_{50}$ of 9.5 μm and tap density of 2.6 g/cm$^3$.

Example 3

A cobalt chloride solution (2 mol/L) and sodium hydroxide solution (8 mol/L) were prepared respectively. To the cobalt chloride solution, hexamethylenetetramine was added. The resultant mixture and the sodium hydroxide solution were simultaneously added into a reactor by a cocurrent method, and allowed to react at 60° C. with pH value at 10.5. Air was charged uniformly as an oxidant, and the amount thereof was 1.8 times that needed for completely oxidizing the generated cobalt hydroxide. After reaction, the solution was aged for 12 hrs at a constant temperature, dried at 110° C., and roasted at 400° C. for 8 hrs to yield spherical tricobalt tetraoxide with diameter $D_{50}$ of 11 μm and tap density of 2.5 g/cm$^3$.

Example 4

A cobalt sulfate solution (1 mol/L) and sodium hydroxide solution (5 mol/L) were prepared respectively. To the cobalt sulfate solution, citric acid was added. The resultant mixture and the sodium hydroxide solution were simultaneously added into a reactor by a cocurrent method, and allowed to react at 50° C. with pH value at 10.5. Hydrogen peroxide was charged uniformly as an oxidant, and the amount thereof was 1.3 times that needed for completely oxidizing the generated cobalt hydroxide. After reaction completion, the solution was aged for 10 hrs at a constant temperature, dried at 110° C., and roasted at 350° C. for 10 hrs to yield spherical tricobalt tetraoxide with diameter $D_{50}$ of 7.2 μm and tap density of 2.7 g/cm$^3$.

Example 5

A cobalt sulfate solution (1 mol/L) and sodium hydroxide solution (5 mol/L) were prepared respectively. To the cobalt sulfate solution, citric acid was added. The resultant mixture and the sodium hydroxide solution were simultaneously added into a reactor by a cocurrent method, and allowed to react at 50° C. with pH value being at 11.5. Hydrogen peroxide as an oxidant was charged uniformly, and the amount thereof was 1.8 times that needed for completely oxidizing the generated cobalt hydroxide. After reaction, the solution was aged for 10 hrs at a constant temperature, dried at 110° C., and roasted at 350° C. for 10 hrs to yield spherical tricobalt tetraoxide with diameter $D_{50}$ of 12 μm and tap density of 2.8 g/cm$^3$.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparation of tricobalt tetraoxide, comprising: (i) oxidizing a bivalent cobalt salt in a wet environment and in the presence of an oxidant, a base, and a complexing agent to yield cobalt oxyhydroxide.cobalt hydroxide; (ii) oxidizing the cobalt oxyhydroxide.cobalt hydroxide to yield tricobalt tetraoxide; and (iii) roasting the tricobalt tetraoxide to yield tricobalt tetraoxide.

2. The method of claim 1, comprising the steps of:
    a) preparing a cobalt salt solution having concentration of between 0.5 and 3 mol/L;
    b) preparing a base solution having concentration of between 1 and 10 mol/L as a precipitant solution;
    c) preparing a complexing agent solution having concentration of between 0.5 and 200 g/L;
    d) mixing said cobalt salt solution, said base solution, and said complexing agent solution in a reactor to form a reaction mixture, allowing the reaction mixture to react with stirring, and constantly adding an oxidant during the reaction; controlling the pH value of the reaction mixture at between 8 and 13, and controlling the reaction temperature at between 40 and 90° C.;
    e) stirring the reaction mixture for between 2 and 48 hrs at a constant temperature; followed by centrifuging, washing, drying, and grinding to yield a precursor of spherical tricobalt tetraoxide; and
    f) roasting said precursor for between 2 and 20 hrs at between 200 and 500° C. to yield spherical tricobalt tetraoxide in a powder form.

3. The method of claim 2, wherein said oxidant is oxygen, air, or hydrogen peroxide, and said oxidant is added in a 1.2 to 3.0 times excess.

4. The method of claim 2, wherein said cobalt salt is cobalt sulfate, cobalt chloride, cobalt oxalate, or cobalt nitrate.

5. The method of claim 2, wherein said base is sodium hydroxide, potassium hydroxide, or a mixture thereof.

6. The method of claim 2, wherein said complexing agent is sodium tartrate, disodium EDTA, ethylenediamine, hexamethylenetetramine, polyacrylamide, or citric acid, or a mixture of two of these.

* * * * *